(12) United States Patent
Kawabe

(10) Patent No.: US 12,136,097 B2
(45) Date of Patent: Nov. 5, 2024

(54) GENUINE PRODUCT AUTOMATIC AUTHENTICATION METHOD

(71) Applicant: SEKISUI MEDICAL CO., LTD., Tokyo (JP)

(72) Inventor: Toshiki Kawabe, Tokyo (JP)

(73) Assignee: SEKISUI MEDICAL CO., LTD., Tokyo (JP)

( * ) Notice: Subject to any disclaimer, the term of this patent is extended or adjusted under 35 U.S.C. 154(b) by 191 days.

(21) Appl. No.: 17/706,594

(22) Filed: Mar. 29, 2022

(65) Prior Publication Data

US 2022/0222685 A1 Jul. 14, 2022

Related U.S. Application Data

(63) Continuation of application No. PCT/JP2020/035942, filed on Sep. 24, 2020.

(30) Foreign Application Priority Data

Sep. 30, 2019 (JP) .................................. 2019-180785

(51) Int. Cl.
G06Q 30/00 (2023.01)
G06F 21/44 (2013.01)
(Continued)

(52) U.S. Cl.
CPC ......... *G06Q 30/0185* (2013.01); *G06F 21/44* (2013.01); *G06F 21/46* (2013.01)

(58) Field of Classification Search
None
See application file for complete search history.

(56) References Cited

U.S. PATENT DOCUMENTS

2005/0049979 A1* 3/2005 Collins ................. G06K 17/00
705/75
2009/0235085 A1* 9/2009 Mathur ................. G06F 21/606
713/184
(Continued)

FOREIGN PATENT DOCUMENTS

JP 2003320658 A 11/2003
JP 2008258663 A * 10/2008
(Continued)

OTHER PUBLICATIONS

Office Action in JP Application No. 2021-550670, mailed Mar. 17, 2022, 14pp.
(Continued)

*Primary Examiner* — Matthew T Sittner
(74) *Attorney, Agent, or Firm* — HAUPTMAN HAM, LLP

(57) ABSTRACT

An automatic authentication method includes an identification code reading step of reading an identification code assigned to an article from an apparatus side. The method includes a password part generation reproduction step of reproducing a procedure for generating a second password part according to a predetermined random character creation rule based on characters included in an identification information part and a first password part of the read identification code. The method includes a password collation step of collating the second password part generated by the reproduction with a second password part of the identification code of the article read by the identification code reading step. The method includes authentication steps of authenticating the article as a genuine product when the collated second password parts match each other.

20 Claims, 8 Drawing Sheets

(51) Int. Cl.
      *G06F 21/46*     (2013.01)
      *G06Q 30/018*    (2023.01)

(56) References Cited

U.S. PATENT DOCUMENTS

| | | | |
|---|---|---|---|
| 2017/0012969 A1 | 1/2017 | Li | |
| 2017/0127104 A1* | 5/2017 | Thomas | H04N 21/2393 |
| 2017/0235832 A1 | 8/2017 | Cong et al. | |
| 2017/0336428 A1* | 11/2017 | Kwang | G01N 35/00663 |
| 2018/0218187 A1* | 8/2018 | Freeman | G06F 21/45 |
| 2018/0254904 A1 | 9/2018 | Hwang | |
| 2019/0080059 A1 | 3/2019 | Takumi et al. | |

FOREIGN PATENT DOCUMENTS

| | | | | |
|---|---|---|---|---|
| JP | 20189841 A | | 1/2018 | |
| JP | 2018009841 A | * | 1/2018 | |
| JP | 201862884 A | | 4/2018 | |
| JP | 2018062884 A | * | 4/2018 | |
| JP | 2018528504 A | | 9/2018 | |
| JP | 2018530235 A | | 10/2018 | |
| JP | 201950507 A | | 3/2019 | |
| WO | WO-2014014401 A2 | * | 1/2014 | G06Q 10/08 |

OTHER PUBLICATIONS

International Search Report in PCT Application No. PCT/JP2020/035942, mailed Dec. 15, 2020, 12pp.
Brock D L, White Paper. The Electronic Product Code (EPC) as a Meta Code, Internet Citation, Sep. 1, 2023, xp002422185, URL:http://autoid.mit.edu/whitepapers/MIT-AUTOID-WH020.pdf, 23pp.
Extended European Search Report in EP Application No. 20872663.8, dated Jul. 20, 2023, 9pp.

\* cited by examiner

FIG. 5

| CHARACTER POSITION | 1 | 2 | 3 | 4 | 5 | 6 | 7 | 8 |
|---|---|---|---|---|---|---|---|---|
| CODE INFORMATION | PRODUCT IDENTIFICATION | | | | PASSWORD (PW) | | | |
| DISTINGUISH | A | | B | | P1&P2 | | | |
| SYMBOL | A1 | A2 | B1 | B2 | D1 | C1 | D2 | C2 |
| EXAMPLE OF CHARACTER OF EACH DIGIT | 2 | A | 1 | 0 | C | H | d | U |

FIG. 6

TABLE 1 (81)

| # | ## | char |
|---|---|---|
| 1 | 48 | 0 |
| 2 | 49 | 1 |
| 3 | 50 | 2 |
| 4 | 51 | 3 |
| 5 | 52 | 4 |
| 6 | 53 | 5 |
| 7 | 54 | 6 |
| 8 | 55 | 7 |
| 9 | 56 | 8 |
| 10 | 57 | 9 |
| 11 | 65 | A |
| 12 | 66 | B |
| 13 | 67 | C |
| 14 | 68 | D |
| 15 | 69 | E |
| 16 | 70 | F |
| 17 | 71 | G |
| 18 | 72 | H |
| 19 | 73 | I |
| 20 | 74 | J |
| 21 | 75 | K |
| 22 | 76 | L |
| 23 | 77 | M |
| 24 | 78 | N |
| 25 | 79 | O |
| 26 | 80 | P |
| 27 | 81 | Q |
| 28 | 82 | R |
| 29 | 83 | S |
| 30 | 84 | T |
| 31 | 85 | U |
| 32 | 86 | V |
| 33 | 87 | W |
| 34 | 88 | X |
| 35 | 89 | Y |
| 36 | 90 | Z |
| 37 | 97 | a |
| 38 | 98 | b |
| 39 | 99 | c |
| 40 | 100 | d |
| 41 | 101 | e |
| 42 | 102 | f |
| 43 | 103 | g |
| 44 | 104 | h |
| 45 | 105 | i |
| 46 | 106 | j |
| 47 | 107 | k |
| 48 | 108 | l |
| 49 | 109 | m |
| 50 | 110 | n |
| 51 | 111 | o |
| 52 | 112 | p |
| 53 | 113 | q |
| 54 | 114 | r |
| 55 | 115 | s |
| 56 | 116 | t |
| 57 | 117 | u |
| 58 | 118 | v |
| 59 | 119 | w |
| 60 | 120 | x |
| 61 | 121 | y |
| 62 | 122 | z |

TABLE 2 (82)

|  | 0 | 1 | 2 |
|---|---|---|---|
| 0 | 4 | S | H |
| 1 | 7 | 3 | N |
| 2 | N | Q | G |
| 3 | d | Y | 5 |
| 4 | Y | H | N |
| 5 | a | Z | f |
| 6 | M | Z | J |
| 7 | G | G | b |
| 8 | x | b | j |
| 9 | g | o | A |
| 10 | D | a | v |
| 11 | P | k | j |
| 12 | u | g | v |
| 13 | G | J | F |
| 14 | 2 | e | u |
| 15 | 1 | U | 2 |
| 16 | 4 | C | 9 |
| 17 | j | 0 | h |
| 18 | J | B | U |
| 19 | K | u | m |
| 20 | E | o | 9 |
| 21 | T | K | D |
| 22 | I | c | b |
| 23 | a | F | E |
| 24 | K | Y | T |
| 25 | X | h | S |
| 26 | s | D | 1 |
| 27 | I | W | X |
| 28 | l | F | t |
| 29 | F | J | s |
| 30 | q | V | m |
| 31 | O | P | h |
| 32 | 4 | D | T |
| 33 | I | M | Y |
| 34 | 1 | Y | R |
| 35 | c | d | Z |
| 36 | U | l | v |
| 37 | A | U | d |
| 38 | K | A | q |
| 39 | h | q | t |
| 40 | 5 | h | x |
| 41 | v | o | h |
| 42 | I | B | O |
| 43 | 5 | X | F |
| 44 | B | p | 8 |
| 45 | N | f | W |
| 46 | f | b | P |
| 47 | 2 | X | S |
| 48 | P | K | B |
| 49 | Z | 8 | y |
| 50 | z | h | W |
| 51 | q | a | C |
| 52 | 6 | g | g |
| 53 | T | e | a |
| 54 | b | 0 | J |
| 55 | o | 7 | 7 |
| 56 | O | z | A |
| 57 | l | O | d |
| 58 | k | E | i |
| 59 | 4 | X | W |
| 60 | x | a | E |
| 61 | S | P | g |
| 62 | J | Q | 0 |
| 63 | O | g | 6 |
| 64 | o | b | V |
| 65 | s | Q | s |
| 66 | Q | T | o |
| 67 | 3 | Y | C |
| 68 | 6 | 4 | L |
| 69 | U | 2 | N |
| 70 | J | Q | v |
| 71 | l | g | S |
| 72 | n | 8 | j |
| 73 | j | d | y |
| 74 | 3 | W | U |

FIG. 7

ARRAY OF PW DETERMINED BY C1 INFORMATION — 83

| Type | C1 | | | | | | | | |
|---|---|---|---|---|---|---|---|---|---|
| 1 | A | G | M | S | Y | e | k | q | w | 2 | 8 |
| 2 | B | H | N | T | Z | f | l | r | x | 3 | 9 |
| 3 | C | I | O | U | a | g | m | s | y | 4 |
| 4 | D | J | P | V | b | h | n | t | z | 5 |
| 5 | E | K | Q | W | c | i | o | u | 0 | 6 |
| 6 | F | L | R | X | d | j | p | v | 1 | 7 |

FIG. 8

ARRANGEMENT ORDER OF PW (P1 · P2) — 84

| # | 1 | 2 | 3 | 4 | Type |
|---|---|---|---|---|---|
| 1 | C1 | C2 | D1 | D2 | 1 |
| 2 | C2 | C1 | D1 | D2 | |
| 3 | C2 | D1 | C1 | D2 | |
| 4 | C2 | D1 | D2 | C1 | |
| 5 | C1 | C2 | D2 | D1 | 2 |
| 6 | C2 | C1 | D2 | D1 | |
| 7 | C2 | D2 | C1 | D1 | |
| 8 | C2 | D2 | D1 | C1 | |
| 9 | C1 | D1 | C2 | D2 | 3 |
| 10 | D1 | C1 | C2 | D2 | |
| 11 | D1 | C2 | C1 | D2 | |
| 12 | D1 | C2 | D2 | C1 | |
| 13 | C1 | D1 | D2 | C2 | 4 |
| 14 | D1 | C1 | D2 | C2 | |
| 15 | D1 | D2 | C1 | C2 | |
| 16 | D1 | D2 | C2 | C1 | |
| 17 | C1 | D2 | C2 | D1 | 5 |
| 18 | D2 | C1 | C2 | D1 | |
| 19 | D2 | C2 | C1 | D1 | |
| 20 | D2 | C2 | D1 | C1 | |
| 21 | C1 | D2 | D1 | C2 | 6 |
| 22 | D2 | C1 | D1 | C2 | |
| 23 | D2 | D1 | C1 | C2 | |
| 24 | D2 | D1 | C2 | C1 | |

GENUINE PRODUCT AUTOMATIC AUTHENTICATION METHOD

RELATED APPLICATIONS

The present application is a continuation of International Application No. PCT/JP2020/035942, filed Sep. 24, 2020, which claims priority from Japanese Patent Application No. 2019-180785, filed Sep. 30, 2019, the disclosures of which applications are hereby incorporated by reference here in their entirety.

TECHNICAL FIELD

The present invention relates to an automatic authentication method, an automatic authentication module, and an automatic analysis apparatus including the automatic authentication module for verifying whether or not an article is a genuine product on an apparatus side using the article based on an identification code assigned to the article, and particularly relates to an automatic authentication method, an automatic authentication module, and an automatic analysis apparatus including the automatic authentication module for authenticating a genuine product based on an identification code using a random number.

BACKGROUND ART

Conventionally, various methods and systems have been known to verify whether an article (product) is a genuine product or a non-genuine product, and there are many articles on the market for which such authentication is an important issue.

As an example, in an automatic analysis apparatus that can obtain measurement information on various test items by causing a reaction between various reagents and biological samples such as blood and urine, such as a blood coagulation analysis apparatus and an analysis apparatus using an immunoassay method, it is extremely important to verify whether or not a reagent as an article is a genuine product to prevent misuse and use of non-genuine products, or to ensure analysis with the required measurement quality.

Genuine product authentication is generally performed using an identification code including a password, etc., and such an identification code is generated by various methods and strictly managed for various purposes (for example, see Patent Document 1). Specifically, for example, a barcode is printed as an identification code including a password, etc. on a label displayed or affixed to an article, and it is determined whether the article is a genuine product or a non-genuine product by reading the barcode using a barcode reader on an apparatus side that uses the article.

CITATION LIST

Patent Document

Patent Document 1: JP 2018-9841 A

SUMMARY OF THE INVENTION

Problem to be Solved by the Invention

However, an identification code (password, etc.) encoded by a simple conversion or a generation rule is easily decoded by a third party decrypting a generation method thereof when making full use of AI technology of today. In addition, even in the case of an identification code generated by a complicated rule, if an encryption table, etc. is referred to when collating the identification code, the identification code is completely decrypted by a third party if the table is stolen. Such decryption of an identification code by a third party promotes the distribution of non-genuine products (counterfeit products), hinders the use of genuine products, and makes it difficult to strictly control the quality of outputs obtained by using genuine products.

The present invention has been made by paying attention to the above-mentioned problems, and an object of the invention is to provide an automatic authentication method, an automatic authentication module, and an automatic analysis apparatus including the automatic authentication module capable of verifying whether or not an article is a genuine product based on an identification code assigned to the article while making it difficult for a third party to decrypt the identification code.

Means for Solving Problem

To achieve the object, the invention is an automatic authentication method of verifying whether or not an article is a genuine product on a side of an apparatus using the article based on an identification code assigned to the article, the identification code including a character string formed by arranging a plurality of characters, the character string having an identification information part including identification information for identifying the article and a password part, the password part having a first password part including a random character generated based on a random number and a second password part including a random character generated according to a predetermined random character creation rule based on the first password part and the identification information, the method including an identification code reading step of reading the identification code assigned to the article on the apparatus side, a password part generation reproduction step of reproducing a procedure for generating the second password part according to the predetermined random character creation rule based on characters included in the identification information part and the first password part of the identification code read by the identification code reading step, a password collation step of collating a second password part generated by reproduction by the password part generation reproduction step with a second password part of an identification code of an article read by the identification code reading step, and an authentication step of authenticating the article as a genuine product when the second password parts collated by the password collation step match each other.

In the above configuration, not only the identification code generation method in which the identification information of the article is associated with the password is adopted, but also the password part of the identification code is formed by a combination of the random number and the random character creation rule, specifically, by a combination of the first password part generated based on the random number and the second password part generated according to the predetermined random character creation rule based on the first password part and the identification information. That is, while incorporating irregularity into the generation of the first password part by the random number, such a random number is involved in the generation of the second password part by the random character creation rule. Therefore, the difficulty of decrypting the password is increased, and it becomes very difficult for a third party to decrypt the password. Meanwhile, in collation of the identification code on the apparatus side (genuine product authentication), the identification code which is more difficult to decrypt is read, the procedure for generating the second password part is reproduced according to the random character creation rule based on the first password part of the read identification code (random character generated based on the random number) and the identification information, and the reproduced second password part is collated with the read second password part to verify whether or not the article is a genuine product. Thus, generation of the second password part can be reliably reproduced in a manner that is difficult for a third party to decrypt, and it is possible to reliably verify whether or not the article is a genuine product based on the reproduced second password part. Therefore, distribution of non-genuine products (counterfeit products) can be prevented, the use of genuine products is not hindered, and strict quality control of outputs associated with the use of genuine products can be performed.

Note that in the above configuration, the "article" refers to a product or goods regarded as having the same manufacturing quality, and two or more articles are produced. Examples of such an article include ink for a printer, a reagent used in the automatic analysis apparatus, etc. Further, the "identification code" refers to article identification coded information that is displayed or affixed to the article and can be read by some reading means. Examples of such an identification code include a barcode, a QR code (registered trademark), etc. Further, the "apparatus" refers to an apparatus that uses the article as a consumable item and exerts a predetermined function. As the apparatus, a stand-alone apparatus that is not connected to a network (for example, an automatic analysis apparatus used in a stand-alone state in which a usage status of the reagent is not managed) is particularly preferable. However, the apparatus is not limited thereto. For example, in the invention, it is assumed that apparatuses are communicable with each other and/or are mechanically connected and collectively and centrally controlled. Further, the "genuine product" means an article that is genuine. Therefore, articles such as non-genuine counterfeit products and pirated products are non-genuine products. In addition, the "character" is a character that can be read by a general code reader, etc. and can be input by a keyboard, etc. Examples include numbers, alphabets (lower and upper cases), symbols, kana, etc. Further, the "random character" means a character generated based on a random number.

Further, in the above configuration, the predetermined random character creation rule may convert a character into a random character using at least one conversion table. In this case, examples of the conversion table can include a conversion table that converts a numerical value or a combination of numerical values into a random character, a conversion table that converts a character into a numerical value, etc. Further, when such a conversion table is used, in the predetermined random character creation rule, the character may be quantified and calculated, and a calculated value may be used as an input value in the conversion table.

Further, in the above configuration, when each article in the same lot is distinguished, the identification code may be distinguished by a serial number, the serial number being a character string included in the identification information part. On the other hand, when each article in the same lot is not distinguished, the identification code is created so that the first password part is different in the same lot. In this way, since the identification code having the same password part is not created in the same lot, it is possible to prevent the authentication from failing in the authentication count check (described later) in the authentication step on the apparatus. Further, a plurality of conversion tables may be prepared in advance, and the conversion table used in the password part generation reproduction step may be switched according to content of the identification information part or the first password part. Note that here, the "lot" is a collection of a plurality of articles that can be regarded as having the same production condition (manufacturing quality), and the individual lots are distinguished by a "lot number". Further, the "serial number" means a number (character string) for distinguishing individual articles in the same lot. As an example, there are two types of articles, those having a serial number and those not having a serial number.

Further, in the above configuration, the automatic authentication method further includes an identification code storage step of storing an identification code of an article authenticated as a genuine product by the authentication step in a storage unit, in which when an identification code of an article read by the identification code reading step matches any identification code stored in the storage unit, the authentication step preferably does not authenticate the article as a genuine product. For example, when the composition of an article is a container filled with a substance, it is conceivable to use a counterfeit product in which the used container is filled with a counterfeit substance (non-genuine substance) after using a legitimate substance. However, as in this composition, when an identification code of the article read by the identification code reading step matches any of identification codes stored in the storage unit, it is possible to eliminate counterfeit products having the same identification code created in this way by not authenticating the article as a genuine product. Note that the storage unit may store the identification code of the authenticated article by lot or expiration date, and in that case, for example, a storage range of the identification code may be limited from the respective grant rules of lot and expiration date. Specifically, for example, as an example of a lot, when lots from A to Z as one letter of the alphabet are given in the order of production of articles, an expiration date is one year after production, and a production time of a next lot is one year after a previous lot, a period during which lot B can be used passes the expiration date of lot A. In this case, when the article of lot A is reused, it can be determined that the product cannot be used by checking the expiration date after genuine product authentication.

Further, in the above configuration, the password part may include an array of random characters, and the password part generation reproduction step may specify a position of another random character of the password part on the array based on a conversion table from one or more specific random characters of the first password part of the identification code read by the identification code reading step and a position of the random character on an array. In this way, the difficulty of decrypting the password is further increased, and it becomes very difficult for a third party to decrypt the password. Note that as the conversion table for specifying, from one or more specific random characters of the first password part of the read identification code and positions of the random characters on the array, a position of another random character on the array, a list (random character position decrypting table) that specifies the positions of the random characters by rows and columns can be given as an example.

Further, in the above configuration, the automatic authentication method may further include a number-of-times storage step of storing the number of times of authentication and the number of times of non-authentication in the authentication step with regard to an article to which an identification code having the same identification information part is assigned, and an apparatus use restriction signal generation step of generating a signal for restricting use of the apparatus (for example, for suspending the apparatus) when the number of times of non-authentication stored in the number-of-times storage step reaches a predetermined number of times. In this way, it is possible to prevent the use of a non-genuine product (a counterfeit product having a low degree of perfection) having an incomplete identification code. Note that when the apparatus is suspended in accordance with the apparatus use restriction signal generation step, it is preferable to incorporate a function for accepting a suspension state release process using a manually input password, etc. that can release a suspension state on the apparatus side.

Further, after the genuine product authentication step, an article suitability determination step for determining the suitability of the identification information part is executed. In this article suitability determination step, it is determined whether or not an element of the identification information part, such as the article type number, lot number, serial number, expiration date, etc., has content (character string) according to each definition thereof, and when the element is inconsistent with the definition, it is determined that the element has a reading content error.

In addition, the invention provides an automatic authentication module using such an automatic authentication method and an automatic analysis apparatus including the module.

Effect of the Invention

According to the invention, it is possible to provide an automatic authentication method, an automatic authentication module, and an automatic analysis apparatus including the automatic authentication module capable of verifying whether or not an article is a genuine product based on an identification code assigned to the article while making it difficult for a third party to decrypt the identification code.

BRIEF DESCRIPTION OF DRAWINGS

FIG. 5 is a diagram illustrating an example of a configuration array of identification codes;

FIG. 6 is a diagram of two tables illustrating a first example of a conversion table used in automatic authentication;

FIG. 7 is a diagram of a table illustrating a second example of the conversion table used in the automatic authentication;

FIG. 8 is a diagram of a table illustrating a third example of the conversion table used in the automatic authentication;

MODE(S) FOR CARRYING OUT THE INVENTION

Hereinafter, embodiments of the invention will be described with reference to the drawings.

Figure 1:
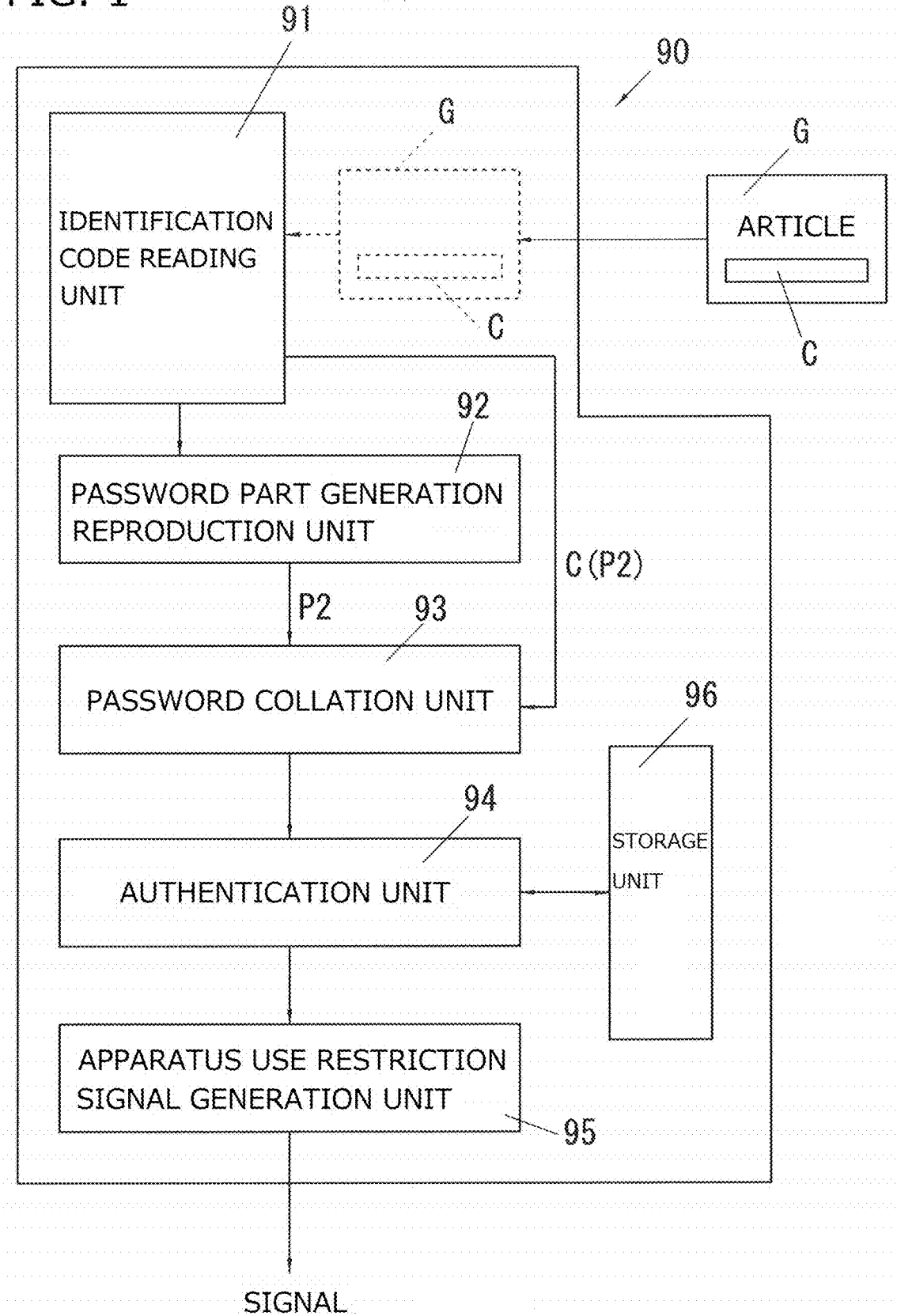
FIG. 1 is a block diagram of an automatic authentication module according to an embodiment of the invention.

FIG. 1 illustrates an automatic authentication module 90 according to an embodiment of the invention for verifying whether or not an article G is a genuine product on an apparatus (not illustrated) side using the article G based on an identification code C assigned to the article G.

Figure 9:
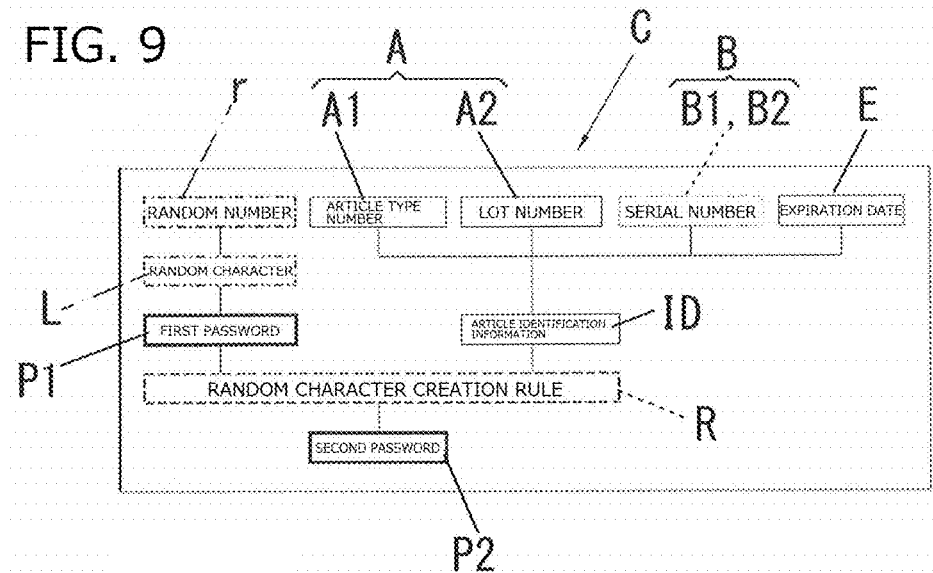
FIG. 9 is a diagram illustrating a detailed generation form of an element of an identification code.

Here, the identification code C includes a character string formed by arranging a plurality of characters. For example, as illustrated in FIG. 5, the identification code C may include a character string formed by arranging eight characters "2", "A", "1", "0", "C", "H", "d", and "U". Further, the identification code C of the character string has an identification information part ID including identification information for identifying the article G and a password part P. For example, in FIG. 5, the identification information part ID is divided into two parts A and B. More specifically, as illustrated in FIG. 9, for example, the identification information part ID may be divided into a first part A including an article type number A1 (for example, a one-digit number from 0 to 9) and a lot number A2 (for example, one letter of the alphabet from A to Z), and a second part B including serial numbers B1 and B2 (for example, two digits from 01 to 99). Note that in FIG. 9, the identification information part ID further has an expiration date E as an element thereof.

As illustrated in FIG. 5, the password part P included in the identification code C has a first password part (which may be referred to as a first password) P1 and a second password part (which may be referred to as a second password) P2. In this case, as illustrated in FIG. 9, the first password part P1 includes random characters L (numbers, lower and upper cases of the alphabet, etc.) generated based on a random number r, while the second password part P2 is generated according to a predetermined random character creation rule R based on the first password part P1 and the identification information (identification information part ID).

Figure 10:
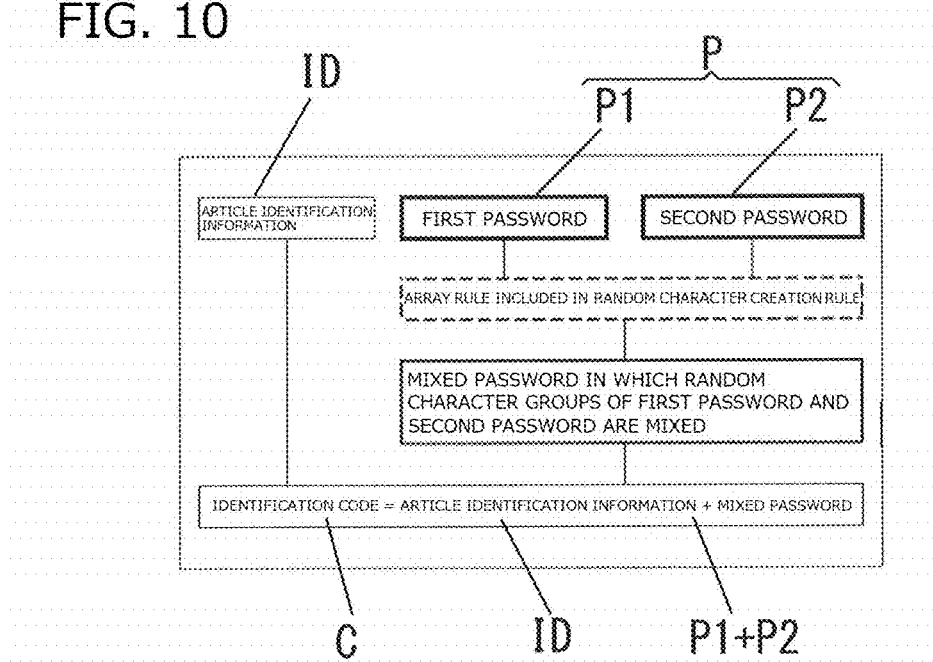
FIG. 10 is a conceptual diagram of a structure of an identification code.

That is, as illustrated in FIG. 10, the password part P including the first password part P1 and the second password part P2 is configured as a mixed password in which random character groups of the first password part P1 and the second password part P2 are mixed according to an arrangement rule included in the random character creation rule R, and the identification code C is configured by a combination of this mixed password (P1+P2) and the identification information part ID.

Note that the password part P may include an array of random characters L as illustrated in FIG. 5, and in particular, in FIG. 5, characters "H" and "U" of elements C1 and C2 included in the first password part P1 and characters "C" and "d" of elements D1 and D2 included in the second password part P2 are alternately arranged. Further, the first password part P1 is not limited to such an array form. For example, a "dummy random character" may be included in the first password part P1. In this way, it becomes more difficult to decrypt the password part P. In this case, the "dummy random character" is not used for generating the second password part P2, and is placed at a predetermined position in the array of the password part P. However, the "dummy random character" is not used for authentication.

Referring back to FIG. 1, the automatic authentication module 90 according to the present embodiment includes an identification code reading unit 91 mounted on an apparatus (not illustrated) that uses the article G to read the identification code C (for example, affixed to the article G as a label printed with a barcode, etc.) assigned to the article G, a password part generation reproduction unit 92 that reproduces a generation procedure of the second password part P2 according to a predetermined random character creation rule R based on characters included in the first password part P1 and the identification information part ID of the identification code C read by the identification code reading unit 91, a password collation unit 93 that collates the second password part P2 generated by reproduction by the password part generation reproduction unit 92 with the second password part P2 of the identification code C of the article G read by the identification code reading unit 91, and an authentication unit 94 that authenticates the article G as a genuine product when the second password parts P2 collated by the password collation unit 93 match each other.

Further, the automatic authentication module 90 further includes a storage unit (identification code storage unit) 96 that stores the identification code C of the article G authenticated as a genuine product by the authentication unit 94. In particular, in the present embodiment, the storage unit 96 functions as a number-of-times storage unit that stores the number of times of authentication and the number of times of non-authentication by the authentication unit 94 with respect to the article G to which the identification code C having the same identification information part ID is assigned. Further, the automatic authentication module 90 of the present embodiment includes an apparatus use restriction signal generation unit 95 that generates a signal for restricting the use of the apparatus (not illustrated) on which the module 90 is mounted when the number of times of non-authentication stored in the storage unit 96 reaches a predetermined number of times.

Note that in the present embodiment, in this way, the automatic authentication module 90 individually includes the identification code reading unit 91, the password part generation reproduction unit 92, the password collation unit 93, the authentication unit 94, the apparatus use restriction signal generation unit 95, and the storage unit 96. However, a functional part that integrates at least some or all of these elements may be included. In short, as long as a function of each of these elements is ensured, the elements may be present in any form.

Next, as an example of an apparatus on which such an automatic authentication module 90 is mounted, an automatic analysis apparatus 1 will be described with reference to FIGS. 2 and 3. As illustrated in FIG. 3, the automatic analysis apparatus 1 includes a reaction portion 40 that holds a reaction vessel 54 into which a specimen is dispensed and a reagent supply portion 70 that supplies the reagent to the reaction vessel 54. By causing a reaction between the reagent supplied from the reagent supply portion 70 to the reaction vessel 54 and the specimen and measuring a reaction process, measurement information is obtained for a predetermined test item. The automatic authentication module 90 mounted on any of the elements of the automatic analysis apparatus 1 is configured to verify whether or not the reagent as the article G is a genuine product. In particular, in the present embodiment, the automatic authentication module 90 including the identification code reading unit 91 that reads the identification code C as a barcode affixed to the reagent vessel (reagent) 32 as an article by a barcode reader is provided to the reagent supply portion 70. Note that only the identification code reading unit 91 may be provided to the reagent supply portion 70, and other elements of the automatic authentication module 90 may be collectively provided to a control unit 10 of the automatic analysis apparatus 1.

Figure 2:
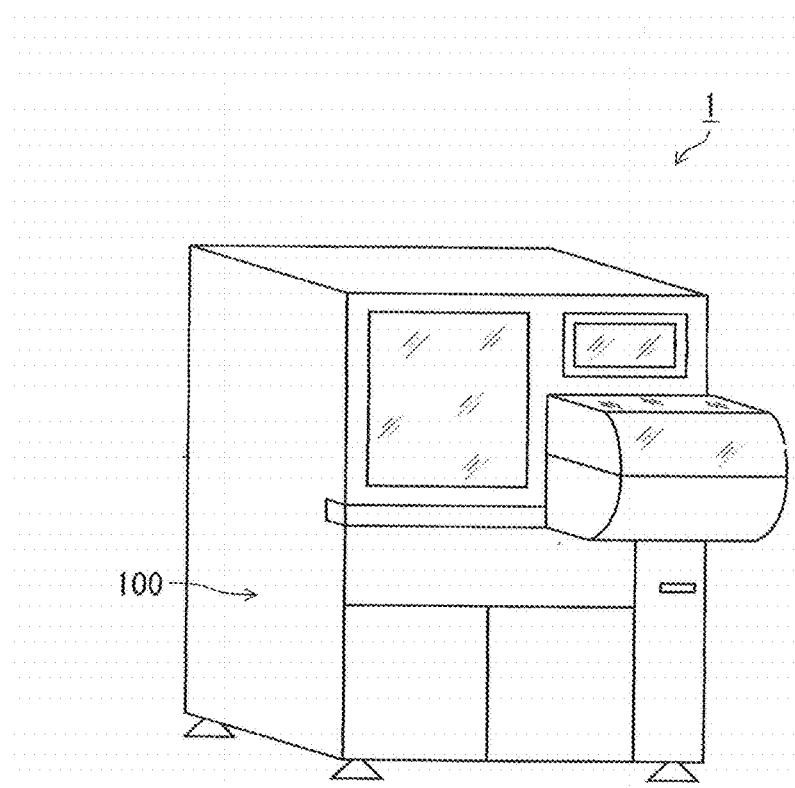
FIG. 2 is a schematic overall external view of an automatic analysis apparatus according to an embodiment of the invention in which the automatic authentication module of FIG. 1 is incorporated.
Figure 3:
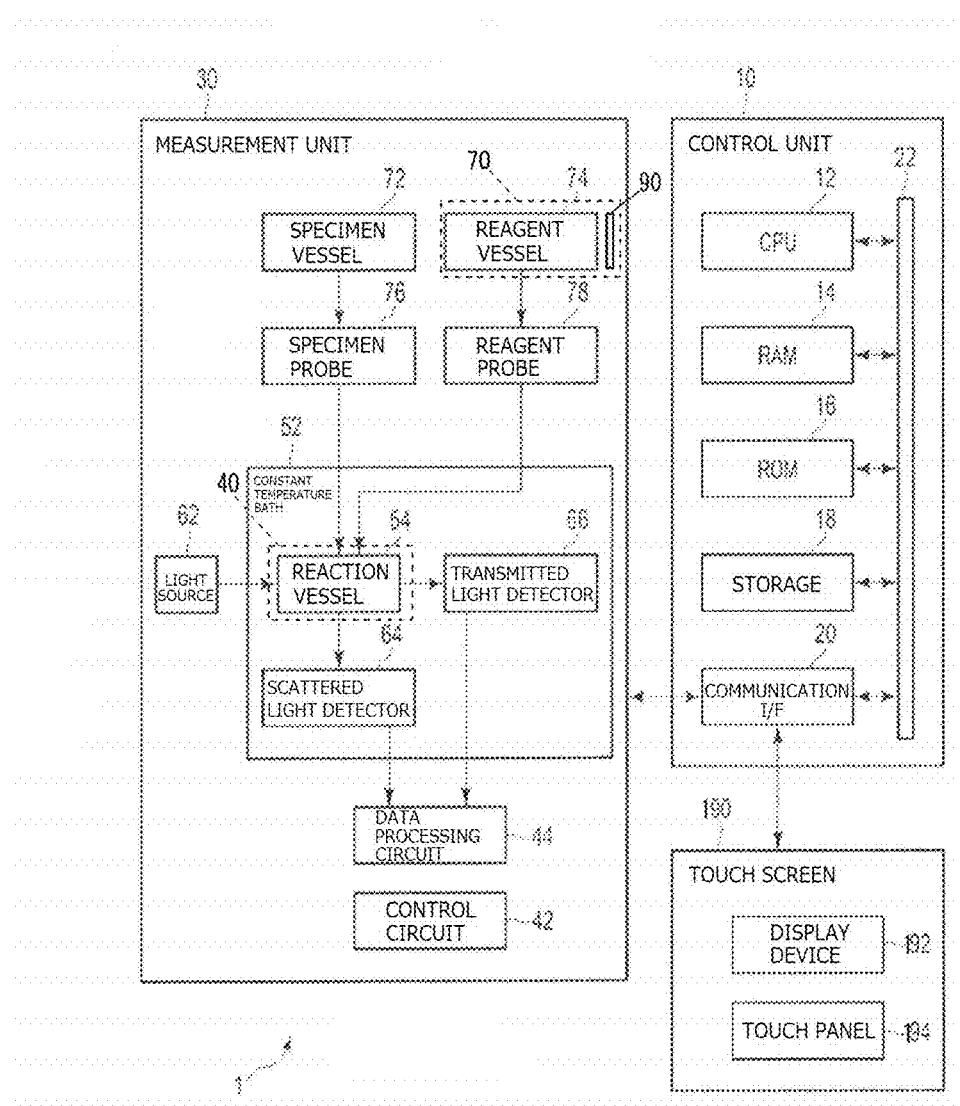
FIG. 3 is a schematic block diagram illustrating an internal configuration of the automatic analysis apparatus of FIG. 2.

FIG. 2 is a schematic overall external view of the automatic analysis apparatus of the present embodiment, and FIG. 3 is a schematic block diagram of the automatic analysis apparatus of FIG. 2. As illustrated in these figures, an outer frame of the automatic analysis apparatus 1 of the present embodiment is formed by a housing 100, and the automatic analysis apparatus 1 is configured by forming a specimen processing space (hereinafter, simply referred to as a processing space) in an upper part of the housing 100.

As clearly illustrated in FIG. 3, the automatic analysis apparatus 1 includes a control unit 10, a measurement unit 30, and a touch screen 190.

The control unit 10 controls the overall operation of the automatic analysis apparatus 1. The control unit 10 includes, for example, a personal computer (PC). The control unit 10 includes a Central Processing Unit (CPU) 12, a Random Access Memory (RAM) 14, a Read Only Memory (ROM) 16, a storage 18, and a communication interface (I/F) 20 connected to each other via a bus line 22. The CPU 12 performs various signal processing, etc. The RAM 14 functions as a main storage device of the CPU 12. As the RAM 14, for example, a Dynamic RAM (DRAM), a Static RAM (SRAM), etc. can be used. The ROM 16 records various boot programs, etc. For the storage 18, for example, a Hard Disk Drive (HDD), a Solid State Drive (SSD), etc. can be used. Various types of information such as programs and parameters used by the CPU 12 are recorded in the storage 18. Further, data acquired by the measurement unit 30 is recorded in the storage 18. The RAM 14 and the storage 18 are not limited thereto, and can be replaced with various storage devices. The control unit 10 communicates with an external device, for example, the measurement unit 30 and the touch screen 190 via the communication I/F 20.

The touch screen 190 includes a display device 192 and a touch panel 194. The display device 192 may include, for example, a liquid crystal display (LCD), an organic EL display, etc. The display device 192 displays various screens under the control of the control unit 10. This screen may include various screens such as an operation screen of the automatic analysis apparatus 1, a screen showing a measurement result, and a screen showing an analysis result. The touch panel 194 is provided on the display device 192. The touch panel 194 acquires an input from a user and transmits the obtained input information to the control unit 10.

The control unit 10 may be connected to other devices such as a printer, a handy code reader, and a host computer via the communication I/F 20.

The measurement unit 30 includes a control circuit 42, a data processing circuit 44, a constant temperature bath 52, the reaction vessel 54, a light source 62, a scattered light detector 64, a transmitted light detector 66, a specimen vessel 72, a reagent vessel 74, a specimen probe 76, and a reagent probe 78. In this case, the reaction vessel 54, the scattered light detector 64, and the transmitted light detector 66 are provided in the constant temperature bath 52.

The control circuit 42 controls an operation of each part of the measurement unit 30 based on a command from the control unit 10. Although not illustrated, the control circuit 42 is connected to the data processing circuit 44, the constant temperature bath 52, the light source 62, the scattered light detector 64, the transmitted light detector 66, the specimen probe 76, the reagent probe 78, etc., and controls an operation of each part.

The data processing circuit 44 is connected to the scattered light detector 64 and the transmitted light detector 66, and acquires a detection result from the scattered light detector 64 and the transmitted light detector 66. The data processing circuit 44 performs various processes on the acquired detection result and outputs a processing result. The processes performed by the data processing circuit 44 may include, for example, an A/D conversion process for converting a format of data output from the scattered light detector 64 and the transmitted light detector 66 into a format that can be processed by the control unit 10.

The control circuit 42 and the data processing circuit 44 may include, for example, a CPU, an Application Specific Integrated Circuit (ASIC), a Field Programmable Gate Array (FPGA), etc. Each of the control circuit 42 and the data processing circuit 44 may be configured by one integrated circuit, etc., or may be configured by combining a plurality of integrated circuits, etc. Further, the control circuit 42 and the data processing circuit 44 may include one integrated circuit, etc. The operation of the control circuit 42 and the data processing circuit 44 may be performed according to, for example, a program recorded in a storage device or a recording area in the circuit.

The specimen vessel 72 contains, for example, a specimen obtained from blood collected from a patient. The reagent vessel 74 contains various reagents used for measurement. Any number of specimen vessels 72 and reagent vessels 74 may be provided. Since there is usually a plurality of types of reagents used for analysis, there is generally a plurality of reagent vessels 74. The specimen probe 76 dispenses the specimen contained in the specimen vessel 72 into the reaction vessel 54 under the control of the control circuit 42. The reagent probe 78 dispenses the reagent contained in the reagent vessel 74 into the reaction vessel 54 under the control of the control circuit 42. Any number of specimen probes 76 and reagent probes 78 may be used.

The constant temperature bath 52 maintains the temperature of the reaction vessel 54 at a predetermined temperature under the control of the control circuit 42. In the reaction vessel 54, a mixed solution obtained by mixing the specimen dispensed by the specimen probe 76 and the reagent dispensed by the reagent probe 78 reacts. Note that any number of reaction vessels 54 may be used.

The light source 62 emits light having a predetermined wavelength under the control of the control circuit 42. The light source 62 may be configured to emit light having a different wavelength depending on the measurement condition. Therefore, the light source 62 may have a plurality of light source elements. The light emitted from the light source 62 is guided by, for example, an optical fiber, and is applied to the reaction vessel 54. The light applied to the reaction vessel 54 is partially scattered and partially transmitted depending on the reaction process state of the mixed solution in the reaction vessel 54. The scattered light detector 64 detects the light scattered in the reaction vessel 54, and detects, for example, the amount of the scattered light. The transmitted light detector 66 detects the light transmitted through the reaction vessel 54, and detects, for example, the amount of transmitted light. The data processing circuit 44 processes information on the amount of scattered light detected by the scattered light detector 64, and processes information on the amount of transmitted light detected by the transmitted light detector 66. Any one of the scattered light detector 64 and the transmitted light detector 66 may operate depending on the measurement condition. Therefore, the data processing circuit 44 may process any one of the information on the amount of scattered light detected by the scattered light detector 64 or the information on the amount of transmitted light detected by the transmitted light detector 66 according to the measurement condition. The data processing circuit 44 transmits processed data to the control unit 10. Note that even though the measurement unit 30 illustrated in FIG. 3 includes two light detectors, the scattered light detector 64 and the transmitted light detector 66, the measurement unit 30 may include any one of the light detectors.

The control unit 10 performs various calculations based on the data acquired from the measurement unit 30. These calculations include calculation of the reaction amount of the mixed solution, quantitative calculation of the substance amount or an activity value of a substance to be measured in a subject based on the reaction amount, etc. The data processing circuit 44 may perform some or all of these calculations.

Note that here, even though the case where a PC that controls the operation of the measurement unit 30 and a PC that performs data calculation and quantitative calculation are the same control unit 10 is illustrated, the PCs may be separate bodies. In other words, the PC that performs the data calculation and the quantitative calculation may exist as each.

Figure 4:
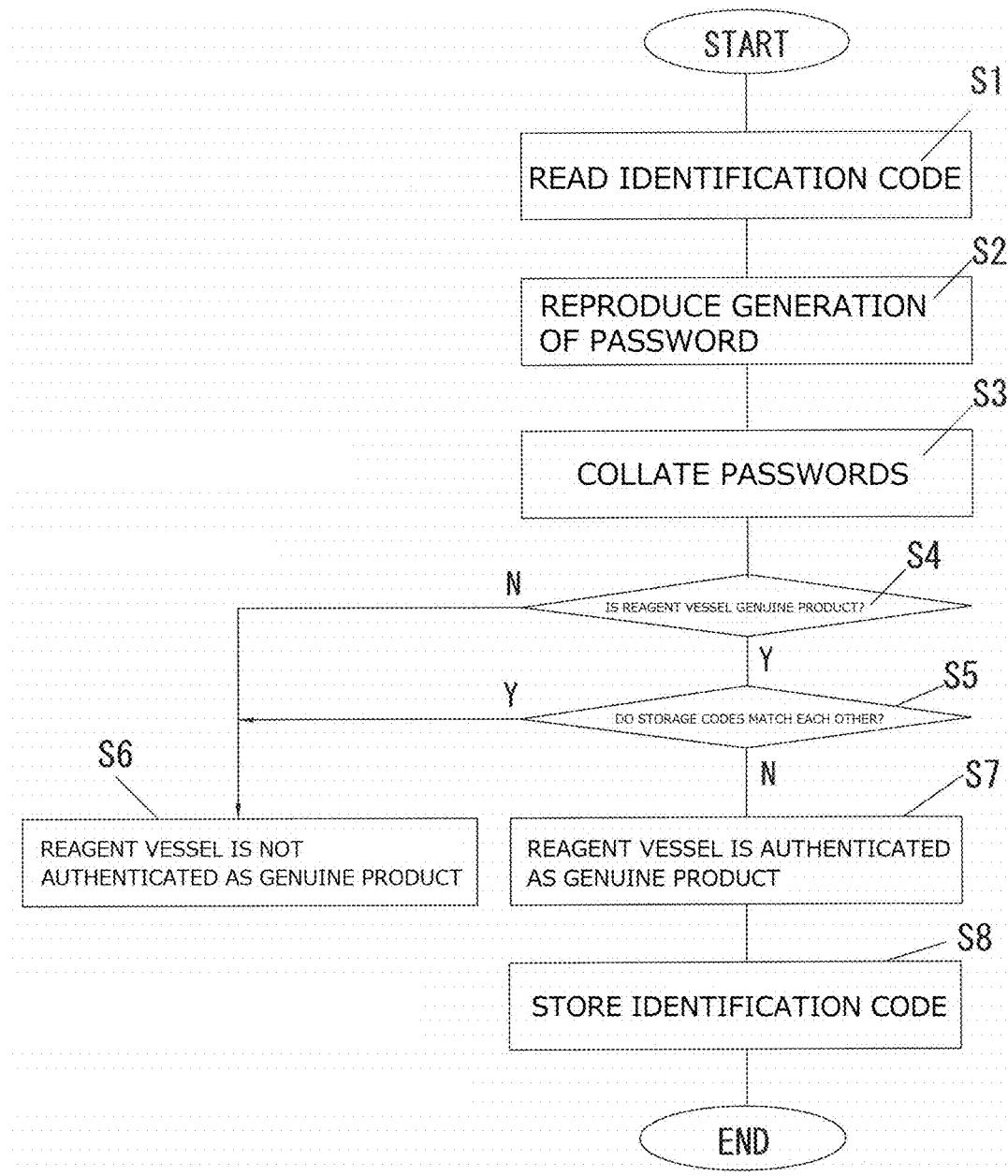
FIG. 4 is a flowchart of an automatic authentication method according to an embodiment of the invention.

Next, a description will be given of a method of verifying whether or not a reagent is a genuine product by the automatic authentication module 90 mounted on the automatic analysis apparatus 1 with reference to FIG. 4 to FIG. 8. First, as illustrated in FIG. 4, the automatic authentication module 90 reads the identification code C assigned to the reagent vessel 32 by the identification code reading unit 91 (identification code reading step S1).

Here, assuming that the identification code C is as illustrated in FIG. 5, the password part (PW) P of the identification code C is created as follows, for example, by using the identification information part ID. That is, a random number is generated by a well-known arbitrary method to create the elements C1 and C2 of the first password part P1. Here, it is assumed that a random number "18" is generated as the element C1 and a random number "31" is generated as the element C2. Thereafter, each of these random numbers "18" and "31" is converted into a random character L using a first conversion table 81 illustrated in FIG. 6 according to a random character creation rule R. In the first conversion table 81, the random number #"18" is converted into a random character "H", and the random number #"31" is converted into a random character "U". As a result, the two elements C1 and C2 of the first password part P1 are determined as "H" and "U", respectively.

Next, based on the first password part P1 created in this way and the identification information ID, the second password part P2 including random characters is created according to the random character creation rule R. Specifically, for example, according to the random character creation rule R, a first numerical value "49", which is the sum of the random number "18" of the element C1 and the random number "31" of the element C2, is obtained. In addition thereto, calculation including multiplying each of the random number "18" of the element C1 and the random number "31" of the element C2 by a predetermined constant is performed according to the random character creation rule R. Here, a second numerical value "1963", which is the sum of a first product "1746" obtained by multiplying the random number "18" of the element C1 by a constant "97" and a second product "217" obtained by multiplying the random number "31" of the element C2 by a constant "7", is obtained. In addition, on the other hand, according to the random character creation rule R, an element A2 (lot number) of the identification information part ID is quantified using the first conversion table 81. In the first conversion table 81, the character (alphanumeric character) "A" of the element A2 of the identification information part ID is converted into a numerical value #"11". This numerical value "11" is added to the character (number) "2" of the element A1 (article type number) of the identification information part ID according to the random character creation rule R, whereby a third numerical value "13" is obtained. Thereafter, according to the random character creation rule R, the first numerical value "49" and the third numerical value "13" obtained earlier are added, and a fourth numerical value "62" is obtained. Subsequently, according to the random character creation rule R, a fifth numerical value "62", which is a remainder of dividing the fourth numerical value "62" by 100, is obtained, a sixth numerical value "2", which is a remainder of dividing the fourth numerical value "62" by 3, is obtained, and the element D1 of the second password part P2 is determined using the second conversion table 82 illustrated in FIG. 6 from these fifth and sixth numerical values. Specifically, a random character "C" obtained by associating the fifth numerical value "62" with a row of the second conversion table 82 and associating the sixth numerical value "2" with a column of the second conversion table 82 is determined as the element D1 of the second password part P2. Thereafter, according to the random character creation rule R, the element D2 of the second password part P2 is determined from the second numerical value "1963" obtained earlier and a numerical value "10" based on the characters (numbers) "1" and "0" of the elements B1 and B2 (serial number) of the identification information part ID. Specifically, the second numerical value "1963" and the numerical value "10" are added to obtain a seventh numerical value "1973", an eighth numerical value "73", which is a remainder of dividing the seventh numerical value "1973" by 100, is obtained, a ninth number "1", which is a remainder of dividing the seventh number "1973" by 3, is obtained, and the element D2 of the second password part P2 is determined using the second conversion table 82 illustrated in FIG. 6 from these eighth and ninth numerical values. Specifically, a random character "d" obtained by associating the eighth numerical value "73" with a row of the second conversion table 82 and associating the ninth numerical value "1" with a column of the second conversion table 82 is determined as the element D2 of the second password part P2. As described above, the random character creation rule R quantifies and calculates a character, and uses a calculated value as an input value of the conversion table.

Note that the identification code C is distinguished by the serial numbers B1 and B2, which are character strings included in the identification information part ID, when each reagent vessel (reagent) in the same lot is distinguished, and is set to that the first password part P1 is different in the same lot when each reagent vessel (reagent) in the same lot is not distinguished.

After the identification code C generated in this way is read by the identification code reading unit 91 as described above, the automatic authentication module 90 subsequently reproduces a procedure for generating the second password part P2 according to the above-mentioned random character creation rule R based on characters included in the first password part P1 of the read identification code C and the identification information part ID by the password part generation reproduction unit 92 (password part generation reproduction step S2). In this way, from one or more specific random characters of the first password part P1 of the identification code C read by the identification code reading unit 91 and a position of the random character on an array, the password part generation reproduction unit 92 may specify a position of another random character of the password part on the array based on the conversion table. Specifically, for example, in the example of the identification code C of FIG. 5, the password part generation reproduction unit 92 determines that "H" is Type 4 using the third conversion table 83 illustrated in FIG. 7 from the fact that the random character of the element C1 of the first password part P1 is "H", then detects positions of other password elements D1, D2, and C2 from a number #14 corresponding to the position of the element C1 on the password array (here, C1 is located second on the array (see FIG. 5)) from numbers #13 to #16 of Type 4 based on the fourth conversion table 84 illustrated in FIG. 8, and specifies random characters thereof.

In response to the password part generation reproduction unit 92 reproducing the procedure for generating the second password part P2 according to the random character creation rule R in this way, the password collation unit 93 collates the second password part P2 generated by the reproduction with the second password part P2 of the identification code C of the reagent vessel 32 read by the identification code reading unit 91 (password collation step S3). Then, the authentication unit 94 determines whether or not these two random character strings match (step S4). The authentication unit 94 authenticates the reagent vessel 32 as a genuine product when the random character strings match (step S7; authentication step), and does not authenticate the reagent vessel 32 as a genuine product when the random character strings do not match (step S6). Here, the identification code C of the reagent vessel 32 authenticated as a genuine product by the authentication unit 94 is stored in the storage unit 96 (identification code storage step S8). Then, when the identification code C of the reagent vessel 32 read by the identification code reading unit 91 matches any of the identification codes C stored in the storage unit 96 in the authentication process (in the case of YES in step S5), the authentication unit 94 does not authenticate the reagent vessel 32 as a genuine product (step S6). In this way, it is possible to exclude a counterfeit product produced by the same identification code based on the genuine product.

Note that in the present embodiment, with regard to the reagent vessel 32 to which the identification code C having the same identification information part ID is assigned, the authentication unit 94 may store the number of times of authentication and the number of times of non-authentication in the storage unit 96 (number-of-times storage step). Then, in this case, the authentication unit 94 may cause the apparatus use restriction signal generation unit 95 to generate a signal for restricting use of the automatic analysis apparatus 1 when the number of times of non-authentication stored in the storage unit 96 reaches a predetermined number of times (apparatus use restriction signal generation step; see FIG. 1). In this way, it is possible to prevent execution of confirmation work of the possibility of authentication by trial and error for elucidating a password generation method for the purpose of establishing an identification code creation condition of a counterfeit product.

As described above, according to the present embodiment, not only the identification code generation method in which the identification information of the article G (reagent vessel 32) is associated with the password is adopted, but also the password part P of the identification code C is formed by a combination of the random number r and the random character creation rule R, specifically, by a combination of the first password part P1 generated based on the random number r and the second password part P2 generated according to the predetermined random character creation rule R based on the first password part P1 and the identification information ID. That is, while incorporating irregularity into the generation of the first password part P1 by the random number r, such a random number r is involved in the generation of the second password part P2 by the random character creation rule R. Therefore, the difficulty of decrypting the password P is increased, and it becomes very difficult for a third party to decrypt the password. Meanwhile, in correctness determination (genuine product authentication) of the identification code C on the automatic analysis apparatus 1 side, the identification code C which is more difficult to decrypt is read, the procedure for generating the second password part P2 is reproduced according to the random character creation rule R based on the first password part P1 of the read identification code C (random character L generated based on the random number r) and the identification information ID, and the reproduced second password part P2 is collated with the read second password part P2 to verify whether or not the article G (reagent vessel 32) is a genuine product. Thus, generation of the second password part P2 can be reliably reproduced in a manner that is difficult for a third party to decrypt, and it is possible to reliably verify whether or not the article G (reagent vessel 32) is a genuine product based on the reproduced second password part P2. Therefore, distribution of non-genuine products (counterfeit products) can be prevented, the use of genuine products is not hindered, and strict quality control of outputs associated with the use of genuine products can be performed.

Note that the invention is not limited to the above-described embodiment, and can be variously modified and implemented without departing from the gist thereof. For example, in the invention, the configuration form of the identification code C, the form of the conversion table, the content of the random character creation rule R, etc. can be arbitrarily set. Further, the apparatus to which the automatic authentication module 90 is applied is not limited to the automatic analysis apparatus. Further, some or all of the above-described embodiments may be combined, or a part of a configuration may be omitted from one of the above-mentioned embodiments.

What is claimed is:

1. An automatic authentication method of verifying whether or not an article is a genuine product on a side of an apparatus using the article based on an identification code assigned to the article, comprising:
storing, in a storage device, a second password part of an information code of the article;
reading, using a code reader, an identification code affixed to an article on an apparatus side by detecting information in a light signal reflected off the identification code, wherein the information includes a first password part and a second password part, and wherein the first password part is a random number, and the second password part is a random number generated based on the first password part and identification information identifying the article;
processing the light signal to convert the information in the light signal to a digital signal formatted for analysis by a processor;
processing, by the processor, the digital signal to generate a reproduced second password part according to a predetermined random character creation rule based on characters included in an identification information part including identification information and the first password part of the identification code read by the code reader;
collating, by the processor, the reproduced second password part with the second password part of the identification code of the article stored in the storage device;
comparing, by the processor the reproduced second password part with the second password part of the identification code of the article stored in the storage device;
authenticating, by the processor, the article as a genuine product when the reproduced second password part and the second password part of the identification code of the article stored in the storage device are determined to match each other; and
generating a use restriction signal, by the processor, to prevent the use of the article determined to be non-genuine in response to the reproduced second password part and the second password part of the identification code of the article stored in the storage device do not match and allowing, by the processor, distribution of the article for use in response to the reproduced second password part and the second password part of the identification code of the article stored in the storage device matching;
wherein the first password part and the second password part are configured as a mixed password in which random character groups of the first password part and the second password part are mixed according to an arrangement rule included in the random character creation rule.

2. The automatic authentication method according to claim 1, wherein the generating the reproduced second password part according to the predetermined random character creation rule includes converting a character into a random character using at least one conversion table.

3. The automatic authentication method according to claim 1, wherein the collating the reproduced second password part with the second password part of the identification code of the article stored in the storage device includes distinguishing each article in the same lot, the article being distinguished by a serial number, the serial number being a character string included in the identification information part.

4. The automatic authentication method according to claim 1, wherein the collating the reproduced second password part with the second password part of the identification code of the article stored in the storage device includes not distinguishing each article in the same lot, the first password part being different in the same lot.

5. The automatic authentication method according to claim 1, wherein the generating the reproduced second password part according to the predetermined random character creation rule includes quantifying and calculating a character and using a calculated value as an input value of a conversion table.

6. The automatic authentication method according to claim 1, wherein the password part includes an array of the random character, and wherein the generating the reproduced second password part includes specifying another random character based on a conversion table from one or more specific random characters of the first password part of the identification code read by the code reader and a position of the random character on an array.

7. The automatic authentication method according to claim 1:
  wherein the storing, in the storage device, the second password part of the information code of the article includes storing an identification code of an article authenticated as a genuine product in the storage device,
  wherein when an identification code of an article matches any identification code stored in the storage the storage device, the article is not authenticated as a genuine product.

8. The automatic authentication method according to claim 1, further comprising:
  storing, in the storage device, a number of times of authentication and a number of times of non-authentication for an article having an identification code with a same identification information part; and
  generating the use restriction signal for restricting use of the apparatus when the number of times of non-authentication stored in the storage unit reaches a predetermined number of times.

9. The automatic authentication method according to claim 1, wherein the apparatus is a stand-alone apparatus.

10. An automatic authentication module for verifying whether or not an article is a genuine product on a side of an apparatus using the article based on an identification code assigned to the article, comprising:
  a storage device for storing a second password part of an information code of the article;
  a code reader for reading an identification code affixed to an article on an apparatus side by detecting information in a light signal reflected off the identification code, wherein the information includes a first password part and a second password part, and wherein the first password part is a random number, and the second password part is a random number generated based on the first password part and identification information identifying the article;
  a processor, wherein the processor is configured to:
    process the light signal to convert the information in the light signal to a digital signal formatted for analysis by a processor;
    process the digital signal to generate a reproduced second password part according to a predetermined random character creation rule based on characters included in an identification information part of the identification code including identification information and the first password part of the identification code read by the code reader;
    collate the reproduced second password part with the second password part of the identification code of the article stored in the storage device;
    authenticate the article as a genuine product when the reproduced second password part and the second password part of the identification code of the article stored in the storage device are determined to match each other; and
    generate a use restriction signal to prevent the use of the article determined to be non-genuine in response to the reproduced second password part and the second password part of the identification code of the article stored in the storage device do not match and allow distribution of the article for use in response to the reproduced second password part and the second password part of the identification code of the article stored in the storage device matching;
  wherein the first password part and the second password part are configured as a mixed password in which random character groups of the first password part and the second password part are mixed according to an arrangement rule included in the random character creation rule.

11. The automatic authentication module according to claim 10, wherein the predetermined random character creation rule includes a rule for converting a character into a random character using at least one conversion table.

12. The automatic authentication module according to claim 10, wherein when the identification code distinguishes each article in the same lot, the identification code distinguishes the article by a serial number, the serial number being a character string included in the identification information part.

13. The automatic authentication module according to claim 10, wherein in the identification code, when each article in the same lot is not distinguished, the first password part is different in the same lot.

14. The automatic authentication module according to claim 10, wherein the processor is configured to quantify and calculate a character based on a predetermined random character creation rule and uses a calculated value as an input value of a conversion table.

15. The automatic authentication module according to claim 10, wherein the first password part and the second password part include an array of the random character, wherein the processor is configured to specify another random character based on a conversion table from one or more specific random characters of the first password part of the identification code read by the code reader and a position of the random character on an array.

16. The automatic authentication module according to claim 10, wherein the processor is further configured to:
  store in the storage device an identification code of an article authenticated as a genuine product,
  wherein when an identification code of an article read by the code reader matches any identification code stored in the storage device, the processor does not authenticate the article as a genuine product.

17. The automatic authentication module according to claim 10, wherein the processor is further configured to:
  store in the storage device a number of times of authentication and a number of times of non-authentication for an article having an identification code with a same identification information part assigned to the article; and
  generate the use restriction signal for restricting use of the apparatus when the number of times of non-authentication stored in the storage device reaches a predetermined number of times.

18. The automatic authentication module according to claim 10, wherein the apparatus is a stand-alone apparatus.

19. An automatic analysis apparatus comprising:
  a storage device for storing a second password part of an article;
  a reaction portion for holding a reaction vessel, a specimen being dispensed into the reaction vessel; and
  a reagent supply portion for supplying a reagent to the reaction vessel, and
  a processor configured to obtain measurement information for a predetermined test item by causing a reaction between a reagent supplied from the reagent supply portion to the reaction vessel and a specimen to measure a reaction process, wherein the processor is further configured to verify whether or not the reagent as the article is a genuine product based on reading an identification code by detecting information in a light signal reflected off the identification code, wherein the light signal includes a first password part and a second password part, and wherein the first password part is a random number, and the second password part is a random number generated based on the first password part and identification information identifying the article;

wherein the processor is further configured to generate a reproduced second password part according to a predetermined random character creation rule based on characters included in an identification information part including identification information and the first password part of the identification code read by the code reader;

wherein the processor is further configured to authenticate the article as a genuine product when the reproduced second password part and the second password part of the identification code of the article stored in the storage device match each other;

wherein the processor is further configured to generate a use restriction signal, by the processor, to prevent the use of the article determined to be non-genuine in response to the reproduced second password part and the second password part of the identification code of the article stored in the storage device do not match and allow distribution of the article for use in response to the reproduced second password part and the second password part of the identification code of the article stored in the storage device matching; and wherein the first password part and the second password part are configured as a mixed password in which random character groups of the first password part and the second password part are mixed according to an arrangement rule included in the random character creation rule.

20. The automatic analysis apparatus of claim 19, wherein the identification information includes a number identifying a type of the article and a lot number associated with the article.

* * * * *